United States Patent [19]

Skarman

[11] Patent Number: 4,668,876
[45] Date of Patent: May 26, 1987

[54] TOUCH CONTROL SWITCH AND LAMP SYSTEM

[76] Inventor: John S. Skarman, 920 Nottingham Rd., Newport Beach, Calif. 92660

[21] Appl. No.: 738,079

[22] Filed: May 24, 1985

Related U.S. Application Data

[63] Continuation-in-part of Ser. No. 625,503, Jun. 28, 1984, abandoned.

[51] Int. Cl.[4] .............................................. H05B 37/02
[52] U.S. Cl. ..................................... 307/116; 307/157; 307/117; 200/DIG. 1; 323/300; 315/291
[58] Field of Search ............... 307/112, 113, 114, 115, 307/116, 117, 157; 200/DIG. 1; 340/555, 581, 583, 584; 315/291; 323/300

[56] References Cited

U.S. PATENT DOCUMENTS

| | | | |
|---|---|---|---|
| 3,440,347 | 4/1969 | Spencer et al. | 307/117 X |
| 4,119,864 | 10/1978 | Petrizio | 307/116 |
| 4,152,629 | 5/1979 | Raupp | 200/DIG. 1 X |
| 4,198,574 | 4/1980 | Price et al. | 307/117 X |
| 4,237,386 | 12/1980 | Instance | 307/116 |
| 4,246,494 | 1/1981 | Foreman et al. | 307/116 |
| 4,250,432 | 2/1981 | Kohler | 307/116 X |
| 4,264,831 | 4/1981 | Wern | 307/116 X |
| 4,321,479 | 3/1982 | Ledniczki et al. | 307/116 |
| 4,360,737 | 11/1982 | Leopold | 200/DIG. 1 X |
| 4,490,625 | 12/1984 | Dilly | 307/116 |
| 4,558,261 | 12/1985 | Cheng | 307/116 X |
| 4,584,519 | 4/1986 | Gruodis | 323/300 X |

Primary Examiner—William M. Shoop, Jr.
Assistant Examiner—Shik Luen Paul Ip
Attorney, Agent, or Firm—Knobbe, Martens, Olson & Bear

[57] ABSTRACT

Disclosed is a touch control lamp system, including a touch control dimmer switch adapted to be plugged into a standard electrical household outlet, and a lamp having a male electrical plug adapted to plug into the touch control switch. When the plug from the lamp is plugged into the touch control switch, a touch control wire in the power cord of the lamp connects a conductive portion of the lamp to the touch control circuitry in the touch control switch, so that the lamp may be controlled by touching the conductive portion of the lamp. Moreover, a conventional lamp may be plugged into the touch control switch, which may be controlled by a touch control wire separately connected to the touch control switch.

13 Claims, 5 Drawing Figures

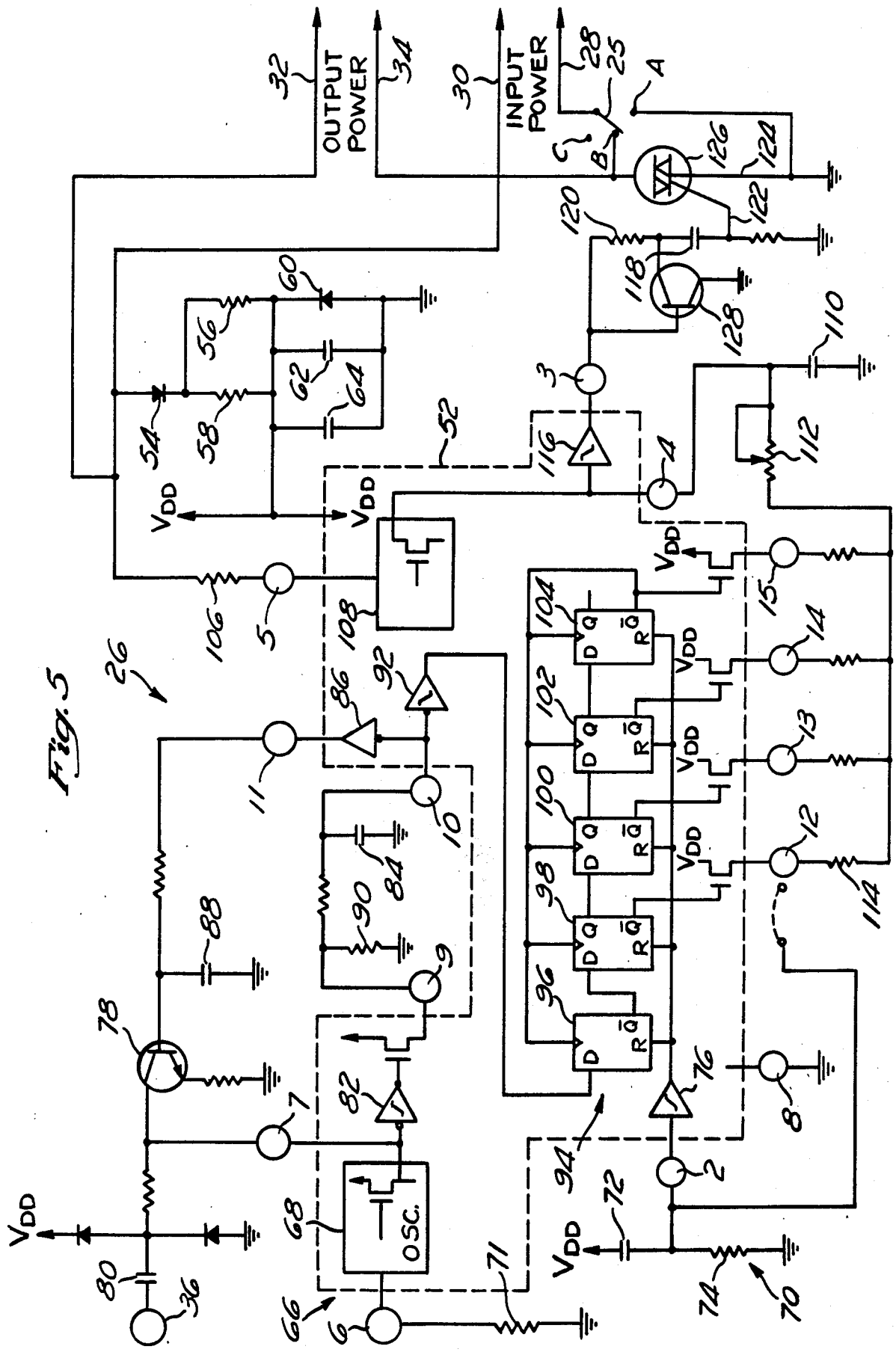

TOUCH CONTROL SWITCH AND LAMP SYSTEM

CROSS-REFERENCE TO RELATED APPLICATION

This application is a Continuation-In-Part of application Ser. No. 625,503 filed June 28, 1984, abandoned, entitled, "Touch Control Switch With Remote Touch Activation".

BACKGROUND OF THE INVENTION

This invention relates to the field of touch control switches and in particular to a remote touch control switch having an external wire which permits remote activation of the switch.

Touch control circuits which act to turn on and off lamps or other household loads are well-known in the art. For example, U.S. Pat. No. 4,119,864 issued to Petrizio on Oct. 10, 1978 shows a touch control circuit for use with lamps or motors. Applicant's experience is that circuits such as that disclosed in the Petrizio patent are commonly mounted inside lamps with the touch control terminal of the touch control circuit connected to the lamp base itself. Generally in such lamps, the lamp base is made of an electrically conductive material such that when an individual touches the lamp anywhere on the lamp base the switch will be activated. Thus, by merely touching the lamp, an individual may turn the lamp on and off as well as adjust the light level. The requirement that the individual must go to the lamp directly and touch it in order to activate the touch control circuit, however, can be sometimes inconvenient. This is particularly so where the lamp or other appliance for which switch control is desired is located in a position remote from where normal human activity takes place.

In addition, circuits of this type, when built into a lamp, cannot readily be changed to control another lamp. Moreover, if the touch control circuitry fails, the lamp must either be discarded or must be repaired. The repair procedure, which encompasses replacing the touch control module, is beyond the ability of most consumers.

Foreman et al., U.S. Pat. No. 4,246,494 issued Jan. 20, 1981 shows another touch control switch. In Foreman, touch control circuitry is mounted within a generally rectangular-shaped housing 88 which is then mounted to a wall or other surface. From the disclosure it appears that Foreman foresees some kind of permanent installation. Such an installation would generally involve expert assistance and in some cases substantial modification to existing household or office circuitry. Furthermore, once the switch location has been selected it cannot be easily moved.

SUMMARY OF THE INVENTION

The present invention provides a simple, inexpensive remotely-actuable lamp dimmer control and a lamp having a special cord and plug for use with the touch control module. The touch control module may also be used with a conventional lamp having a conventional plug and, if desired, the lamp having the special plug may be plugged into an ordinary outlet to be operated by conventional means.

Accordingly, there is provided in accordance with one aspect of the present invention a touch control lamp system. This system includes a housing, a touch control circuit mounted within the housing, which circuit has a touch control terminal, an input for providing power to the touch control circuit, and an output for providing output power controlled by the circuit in response to touching contact communicated either directly or by means of a wire to the touch terminal. A female electrical outlet is provided on the housing connected to the output of the touch control circuit and is adapted to receive a standard male electrical household plug. A lamp having a power cord terminating in a male electrical plug that is adapted to be plugged into a standard female electrical household outlet is provided for supplying power to the lamp. A touch control wire is included on the cord. This wire has a first end attached to a conductive portion of the lamp, and a second end at the plug. Means are provided on the plug and on the housing for connecting the second end of the touch control wire to the touch control terminal when the plug is inserted into the outlet, so that the touch control circuit can be actuated by touching the conductive portion of the lamp.

In accordance with another aspect of the invention, means are provided on the housing for attaching a second touch control wire to the touch control terminal. This permits remote actuation of the touch control circuitry, and also permits the module containing the touch control circuitry to be used with any incandescent lamp having a standard male electrical household plug.

In a preferred embodiment, the means for connecting the touch control wire on the power cord to the touch control terminal comprises a first contact carried by the housing in the proximity of the outlet and connected to the touch control terminal, and a second contact carried by the male electrical plug that is in electrical contact with the touch control wire and is adapted to make electrical contact with the first contact on the housing when the plug is inserted into the outlet. The first contact on the housing preferably extends outwardly from the housing.

Thus, applicant has provided a simple, inexpensive, remotely activated modular touch control system which can be set up using ordinary office or household objects (including people and plants) as the touch input to unobtrusively and conveniently control the operation of household type loads, such as fans and lamps.

BRIEF DESCRIPTION OF THE DRAWINGS

FIG. 5 is a schematic of a preferred touch control circuit which can be used in the remotely activated touch control switch of FIGS. 1 and 2.

DETAILED DESCRIPTION OF PREFERRED EMBODIMENTS

Figures 1, 2, 3, 4:
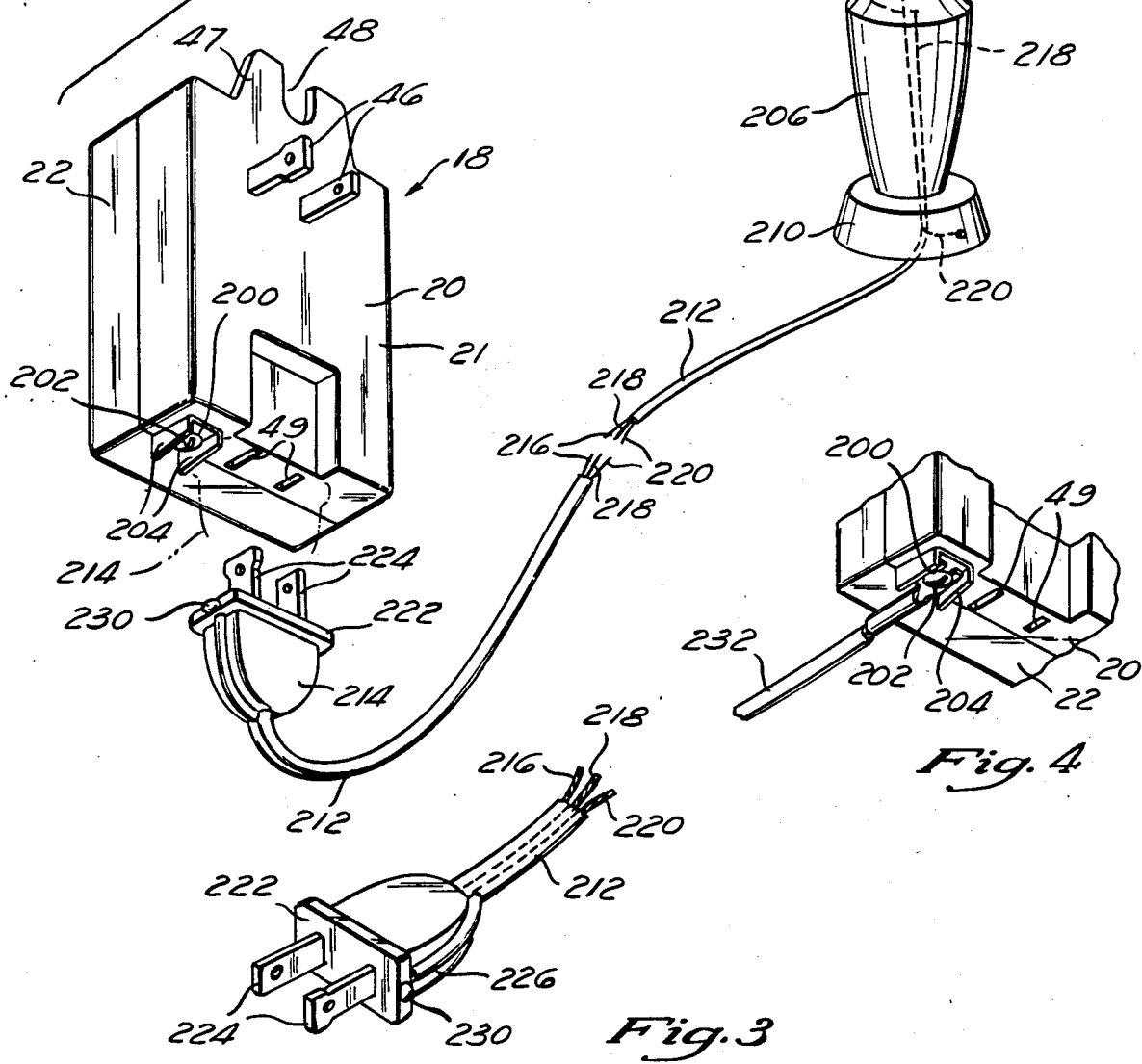
FIG. 1 is a front perspective view of a preferred embodiment of the remotely activated touch control switch.
FIG. 2 is a rear perspective view of the remotely activated touch control switch of FIG. 1 in one suggested application.
FIG. 3 is a perspective view of a plug and cord to be used with the switch of FIGS. 1 and 2.
FIG. 4 is a partial perspective view of the outlet on the switch of FIGS. 1 and 2 showing the atachment of a remote touch sensor wire.

Referring now to FIGS. 1 and 2, a preferred embodiment of the remotely activated touch control switch of the present invention will be described. The touch control switch 18 includes a housing 21 formed of two halves 20 and 22. The front housing half 22 has an opening 24 therein for permitting switch 25 to protrude therethrough. The interiors of housing halves 20 and 22 together form a generally rectangular box-like housing 21 into which the touch control circuitry, described in more detail in connection with FIG. 5, may be placed.

Referring now to FIG. 5, a diagram of the touch control circuit 26 advantageously used in the present invention is shown. The touch control circuit has input lines 28 and 30 for accepting ordinary household AC current. In the United States this current is usually between 110 and 120 volts at 60 hertz. Of course, if it is desired that this touch control switch be used in countries having different household voltage levels, one of ordinary skill in the art would be capable of readily modifying the circuit to accommodate these different voltage levels. The circuit also has two output leads, 32 and 34, which are intended to be connected to the load to be controlled.

Switch 25, shown schematically on the right hand side of FIG. 5, is a 3-position switch capable of being placed in connection with terminal A, B, or C. When the switch is in contact with terminal C, the touch control circuit is off and a complete circuit cannot be formed by a load between output lines 32 and 34. When switch 26 is in contact with terminal B, the touch control circuitry is bypassed and the input power is directly applied to the output power lines 32 and 34. Finally, in position A of switch 26, the touch control circuit controls the power output through lines 32 and 34. Thus, when switch 26 is in position A, touch terminal 36 at the left hand side of FIG. 5 controls the switching function of the circuit through human contact.

The touch circuit advantageously provides five output power states at leads 32 and 34. These states are no power, low power, medium power, medium-high power and high power. The circuit 26 is stepped through these states by sequentially touching touch terminal 36. Power input for the circuit is obtained through the rear housing half 20 by connector prongs 46. Prongs 46 are in the form of a conventional polarized household male plug and may be directly plugged into a conventional household wall socket. Flange 47 and recess 48 are formed and positioned so that the screw used to hold on a conventional face plate surrounding a wall socket can be unscrewed and used to secure housing 21 to the wall. This is accomplished by unscrewing the central wall socket face plate screw and then screwing it back such that the under portion of the screw head comes in contact with the edges of flange 47. Prongs 46 are electrically connected to input power leads 28 and 30 of circuit 26, shown in FIG. 5. At the end of housing half 20, away from flange 47, are two openings 49 forming a conventional household female outlet for accepting the two-prong type male plug ordinarily used for household appliances. The outlet openings 49 are connected to the output power lines 32 and 34.

Referring again to FIG. 5, the touch control circuit preferably used in the above-described embodiment of the invention will now be discussed in more detail. The circuit is based around a Holt integrated circuit HI-2230, surrounded by dotted lines and labeled 52 in FIG. 5.

The 10 V power ($V_{DD}$) for the integrated circuit 52 is derived from the hot side 30 of the AC input power line 30, 28 with rectification by diode 54. Resistors 56 and 58 limit the current applied to the diode 60 which clamps the charging voltage applied to filter capacitor 62. Capacitor 64 serves as a noise filter. Since capacitor 62 is only charged for one-half of the AC cycle, it must supply the operating current for the other half. This results in some ripple, but the circuit will tolerate it.

The oscillator 66, whose target operating frequency is about 200 KHz, consists of an internal oscillator circuit 68 whose frequency is controlled by an external resistor 71 tied between pin 6 and ground. The output of the oscillator at pin 7 is an open drain output which is pulled to $V_{DD}$ (10 volts) for about 3.5 microseconds and allowed to be open-circuited for about 1.5 microseconds. The total period is about 5 microseconds and thus the frequency is about 200 KHz.

It is necessary to initialize the circuit upon power turn-on. This is accomplished by the reset circuit 70. When power is first applied, capacitor 72 at pin 2 is discharged. The voltage at pin 2 jumps to $V_{DD}$ (10 volts) and begins to drop as capacitor 72 is charged. As long as pin 2 is held at about 5 V, this is detected internally within the chip by Schmitt trigger 76 to apply a reset pulse to the shift register to assure that the output on lines 32 and 34 stays off thus allowing the circuit to stabilize.

Since the control may be used with various plants and other objects having various conductive properties and a given conductive object may encounter different electrical conditions, it is necessary to have an automatic form of adjustment.

This is accomplished by having a current sink consisting of transistor 78 whose level is varied according to the need of the moment. The oscillator 66 charges up the capacitor 80 at the touch lead 36 when pin 7 is pulled to $V_{DD}$ high for 3.5 microseconds. The current sink tries to pull the charge back to ground during the 1.5 microsecond off time of the oscillator. As soon as pin 7 is pulled lower than the lower input threshold of the Schmitt trigger 82 whose input is also at pin 7 (typically 5 V), pin 9 rises to cause capacitor 84 to charge. The voltage across capacitor 84 is monitored by a linear inverter amplifier 86 between pins 10 and 11. If pin 11 drops, then capacitor 88 begins to discharge. The voltage across capacitor 88 determines the value of the sinking current.

The circuit adjusts itself such that the amount of sinking current is just enough, for the capacitance load present, to get pin 7 just below the lower threshold for a short interval. Any change in the steady-state capacitance at the touch lead will result in a change in the sinking current. Due to the time constants in the circuit, which determine how fast capacitor 88 may charge or discharge, a slow change in capacitance will be accommodated.

If too much capacitance is applied to the touch terminal 36, the circuit may not be able to produce enough adjustment and the circuit will exhibit a loss of sensitivity to touch.

Closely tied in with the automatic adjustment circuit just described is the ability of the circuit to detect the touch of a person's hand. Assume that the circuit has stabilized and suddenly a hand is placed on the touch terminal 36. The sinking current begins to rise slowly, but at first is not sufficient to pull pin 7 below the lower threshold voltage during the short 1.5 microseconds that the oscillator is low. Thus pin 9 stays open and capacitor 84 discharges at a rate governed by resistor 90. If the voltage across capacitor 84 drops below the threshold of the detection circuitry 92 at pin 10 (which is typically about 2.2 V), the the shift register 94 will receive a step pulse.

Since the automatic adjustment circuit is trying to readjust to accommodate the new capacitance, there is really a race going on to see whether a touch will be detected or whether the circuit will just recognize the touch as a new steady-state condition. For this reason, the touch should be as abrupt as possible.

The shift register 94 is arranged in a loop and only one stage is set to a one at a time. The reset circuit 70, as discussed earlier, initializes the shift register such that the first stage 96 is at one while the other four, which drive the four outputs, are at a zero or off.

As the touch detection circuit provides a pulse upon recognizing a valid touch, the one from the first stage 96 is propagated to the second stage 98. At the same time, the zero from the last stage is sent to the first stage, replacing the former one. Each successive touch moves the one down the chain, thus energizing each of the four outputs one at a time, until finally the one from the last stage 104 is sent back to the first stage 96 and all four outputs are off.

The AC line voltage is sampled through resistor 106 into pin 5 which leads to circuitry 108 used to detect the crossover points at which time the voltage is zero. At the crossover point, the phase firing capacitor 110 is discharged to zero to provide the proper reference time. The crossover reset time is set by a capacitor inside the integrated circuit.

Each of the four output pins 12, 13, 14 and 15 drive, one at a time, different resistances which govern the charging rate of capacitor 110. For example, in the first lamp position, output pin 12 is at $V_{DD}$ with all other output pins in an open-circuit condition. Capacitor 110, which was discharged at the last cross-over time, begins to charge through resistors 112 and 114.

When the voltage across capacitor 110 rises above the upper threshold of the Schmitt trigger 116 between pins 4 and 3, pin 3 will suddnly drop to ground. While pin 3 was high, capacitor 118 charged up through 120 and the relatively low resistance between the gate lead 122 and lead 124 of the triac 126. As soon as pin 3 drops to ground, the base of transistor 128 is also brought low. This turns transistor 128 on and dumps the charge from capacitor 118 into the gate of the triac 126 producing a very sharp negative gate pulse to fire triac 126 and apply the line voltage to the load for the remaining half of the AC cycle.

As each of the other ouputs is turned on, a lower resistance is used to charge the phase firing capacitor 110, and hence the triac is fired sooner in the cycle.

The operation is repeated each half of the AC cycle. Resistor 112 is adjusted to provide the required power to the lamp in the most critical first position.

Resistivity is a measure of how conductive a given material is. The higher the resistivity the less conductive the object. The degree of resistivity of the object to be used as the touch control touch input can be substantially less than that normally associated with conductors. The range of resistivity for metals considered to be conductors runs from $1.5 \times 10^{-8}$ ohm-meters for silver to a high of about $135 \times 10^{-8}$ ohm-meters for manganese. All of these values are calculated at room temperature. Semi-conductors are generally in the range of $10^{-4}$ to $10^{+5}$ ohm-meters while insulators are generally in the range of about $10^8$ to $10^{16}$ ohm-meters. It has been found that the touch control works quite well for all metals as well as most semi conductors. This fact greatly expands the number of objects which can be used as touch control points to include objects which have resistivities greater than $10^{-4}$ ohm-meters.

For this reason the touch control input to the touch terminal 36 can be nearly any living organism including human beings. Thus, for example, one human being could be hooked up to touch wire so that any touching of that human being will activate the touch control circuit. The possibilities here are endless and it can be seen that a lamp could for example be turned off by a hand shake or a kiss.

The touch terminal 36 of the touch control circuit 26 is connected to an external terminal 200 on the exterior of the housing 20, 22 adjacent the household female outlet openings 49. The external terminal 200 is preferably mounted on the housing 20, 22 by means of a metal screw 202. The screw 202 preferably threads into an electrically conductive opening conductively connected to touch terminal 36. The external terminal 200 preferably has at least one flange 204 extending outwardly from the housing. The external terminal 200 is situated directly adjacent to the outlet openings 49; however, there is sufficient distance between the external terminal 200 and the outlet openings so that a conventional male household plug can be inserted into the outlet openings 49 and is not prevented from being so inserted by the external terminal 200. For example, the distance between the external terminal 200 and the closest outlet opening 49 may be from 4 to 20 mm, and is preferably from about 8 to about 16 mm.

Also included as part of the system of the present invention is an incandescent lamp 206. At least one portion 210 of the lamp 206 is conducted. That portion may be the base of the lamp, for example, as shown in FIG. 2. Alternatively, it may be the lamp shade, the lamp stem, or even a special conductive pad or plate anywhere on the lamp.

The lamp 206 has a power cord 212 running to a male electrical household plug 214. The plug 214 is preferably a polarized plug adapted to be inserted into a conventional female electrical household outlet. The power cord 212 carries at least two power conductors 216 and 218. In addition, the power cord 212 carries a touch control wire 220. Optionally, the power cord may also carry other conductors, such as a ground wire (not shown). Where the power cord 212 is flat "zip" cord, as in the preferred embodiment, it is preferred that the touch control wire 220 be on one side of the cord, and that the power conductors 216 and 218 be in the middle and on the other side of the power cord 212, as shown in FIG. 3. This configuration reduces false triggering and undesirable responses to transients in the power conductors 216.

With reference to FIG. 3, the male plug 214, although adapted to be plugged into a conventional household outlet, has been modified to connect the touch control wire 220 to the touch terminal 36 when the plug 214 is inserted into the outlet openings 49. This may be done in any of a number of ways. The plug 214 itself preferably has a flat portion 222 defining a plane from which a pair of conductive prongs 224 extend in one direction. In order that the plug 214 can be plugged into a conventional household electrical outlet, it is preferred that the means for connecting the touch control wire 220 to the touch terminal 36 do not extend beyond the flat portion 222 (or the plane it defines) in the direction of the prongs 224.

The preferred structure for making the connection between the touch control wire 220 and the touch terminal 36 is that shown in FIGS. 2, 3, and 4. In these embodiments, the plug 214 has at least one side 226 generally orthogonal to the flat portion 222 from which the prongs 224 extend. An electrical contact 230 is located on the side of the plug. A matching electrical contact, such as the flange 204 on the external terminal 200, is located adjacent to the outlet openings 49. In the illustrated embodiment, when the plug 214 is plugged into the outlet openings 49 (as shown in phantom in FIG. 2), the electrical contact 230 on the side 226 of the plug 214 presses against and makes electrical contact with the flange 204 on the external terminal 200. In an alternative embodiment, the electrical contact 230 is a generally flat conductor on the flat portion 222 of the plug 214 on the side from which the prongs 224 extend.

In one preferred embodiment, the electrical contact 230 on the plug 214 is a button, which may be exposed. Alternatively, the contact 230 may be a flange, a bar, a tab, a wire, or even a male or female electrical connector, with an appropriate mating contact on the housing 20, 22 adjacent to the output openings 49.

As best shown in FIG. 4, the touch control switch 18 also has a means for connecting a second external touch control wire 232 to the touch terminal 36. This may be any type of plug or connector to which a wire may be attached. A large number of equivalent connectors exist and are well known in the art. In the illustrated embodiment, FIG. 4, a spade lug crimp connector is attached to the second touch control wire 232. The spade lug is fastened under the screw 202, which is in turn electrically connected to the touch terminal 36. The second touch control wire 232 may be run to any conductive surface one desires to use to control the lamp or other appliance plugged into the outlet openings 49. The conductive surface, for example, could be a paperweight, a door knob, another person, or even a plant. When the second touch control wire 232 is run to a plant, it is best to actually insert one end of the wire or a connector directly into the plant itself, in order to establish the best electrical contact.

In still another embodiment of the invention (not illustrated), it is possible to have means on the housing 20, 22 connected to the touch terminal 36 for connecting multiple touch control wires to the touch control switch. These means may be multiple conventional wire connectors.

It is important that the outlet openings 49 be adapted to receive a conventional male household plug, as well as the specially configured male plug 214. With the touch control lamp system described above, including the touch control switch 18 and the lamp 206 with the plug 214, the parts may be used individually or together. In other words, the lamp 206 may be plugged into a standard female electrical outlet 214 for conventional operation (without touch control). By the same token, a conventional lamp or other appropriate appliance having a conventional male household plug may be plugged into the outlet openings 49 of the touch control switch 18. Such a conventional lamp, for example, may be controlled by touching the external terminal 200 or any desired object to which the touch terminal 36 of the touch control switch 18 is conductively connected, e.g., by means of a second touch control wire 232. Finally, when the lamp 206 and the touch control switch 18 are used together, there is no need for a second touch control wire 232 (unless a second control location is desired), and no connection need be made by a user other than plugging the plug 14 into the outlet openings 49 in order to connect the lamp 206 to power and also to connect the conductive portion 210 of the lamp 206 to the touch terminal 36.

What is claimed is:

1. A touch control lamp system, comprising:
   a housing;
   a touch control circuit mounted within said housing, said touch control circuit having a touch control terminal, an input for providing power to said touch control circuit, and an output for providing output power controlled by said circuit in response to touching contact communicated to said touch terminal;
   a female electrical outlet on said housing, connected to the output of said touch control circuit and configured to receive a standard male electrical household plug;
   a lamp having a power cord terminating in a male electrical plug configured to be plugged into a standard female electrical household outlet for supplying power to the lamp;
   a touch control wire on said cord having a first end attached to an exposed conductive portion of said lamp, and a second end terminating at said male plug; and
   means on said plug and on said housing for connecting said second end of said touch control wire on said male plug to said touch control terminal on said housing when said plug is inserted into said outlet, so that said touch control circuit may be actuated by touching said conductive portion of said lamp, wherein said touching is communicated by said touch control wire to said control circuit.

2. The system of claim 1, further comprising means on said housing for attaching a second touch control wire to said touch control terminal.

3. The system of claim 1, wherein said means for connecting said touch control wire to said touch control terminal comprise:
   a first contact carried by said housing in the proximity of said outlet and connected to said touch control terminal; and
   a second contact carried by said plug connected to the second end of said touch control wire adapted to make electrical contact with said first contact when said plug is inserted into said outlet.

4. The system of claim 3, wherein said first contact extends outwardly from said housing.

5. The system of claim 4, wherein said plug has a body portion having a flat side, and a pair of prongs extending out orthogonally from said flat side on one side of the plane defined by said flat side, said prongs configured to be plugged into a standard female electrical household outlet, and wherein said second contact is on the other side of said plane.

6. The system of claim 1, wherein said power cord comprises three side-by-side conductors, and wherein the conductor on one side is the touch control wire, and the conductor in the middle and the conductor on the other side are power conductors for supplying power to the lamp.

7. A lamp control device, comprising:
   a housing;
   a touch control circuit mounted within said housing, said touch control circuit having a touch control terminal, an input for providing power to said touch control circuit, and an output for providing output power controlled by touching contact communicated to said touch terminal;

a female electrical outlet on said housing, connected to the output of said touch control circuit and configured to receive a standard male electrical household plug, said outlet also configured to receive a modified male electrical household plug to which is connected a non-power carrying touch control wire; and a contact adjacent to said outlet and connected to said touch control terminal, said contact adapted to make electrical connection with said touch control wire when said modified plug is inserted into said outlet, while not interfering with the insertion of a standard male electrical household plug into said outlet.

8. The device of claim 7, further comprising a means on said housing for connecting a second touch control wire to said touch control terminal.

9. The device of claim 7, in which said contact extends generally outwardly from said housing.

10. A lamp for use with a touch control circuit, comprising:

a lamp base carrying an incandescent bulb;

a cord having one end connected to said base;

a pair of power conductors in said cord for supplying power to said incandescent bulb;

an exposed conductive portion on said lamp;

a touch control wire in said cord having one end thereof electrically connected to said conductive portion;

a male electrical household plug on the other end of said cord, said plug having a body portion with a flat side, a pair of prongs extending out orthogonally from said flat side, said prongs being connected to said power conductors, said plug adapted to be plugged into a standard female electrical household outlet for supplying power to the lamp; and a contact carried by said plug electrically connected to said touch control wire, said plug further being adapted to be inserted into a specially-designed electrical outlet connected to the output of a touch-control circuit, so that when said plug is inserted into said specially designed outlet, said touch control wire is connected through said electrical contact to a touch control terminal in said circuit, whereby said circuit can be actuated to supply power to said lamp by touching said conductive portion on said lamp.

11. The lamp of claim 10, wherein said contact is located on the plug body portion on one side of a plane defined by said flat side, and said prongs extend out of said plug on the other side of said plane.

12. The lamp of claim 10, wherein said cord comprises three side-by-side conductors, and wherein the conductor on one side of said cord is said touch control wire, and wherein the conductor in the middle and the conductor on the other side are said power conductors.

13. The lamp of claim 11, wherein said plug has a second side on said body portion generally perpendicular to said flat side, and said contact is an exposed button on said second side.

* * * * *